PHOTOMETRIC READ OUT AND ANALYZING SYSTEM

Original Filed March 4, 1968

6 Sheets-Sheet 1

INVENTORS
William H. Plumpe, Jr.
Theodore E. Weichselbaum
BY Hofgren, Wegner, Allen, Stellman & McCord
ATTORNEYS

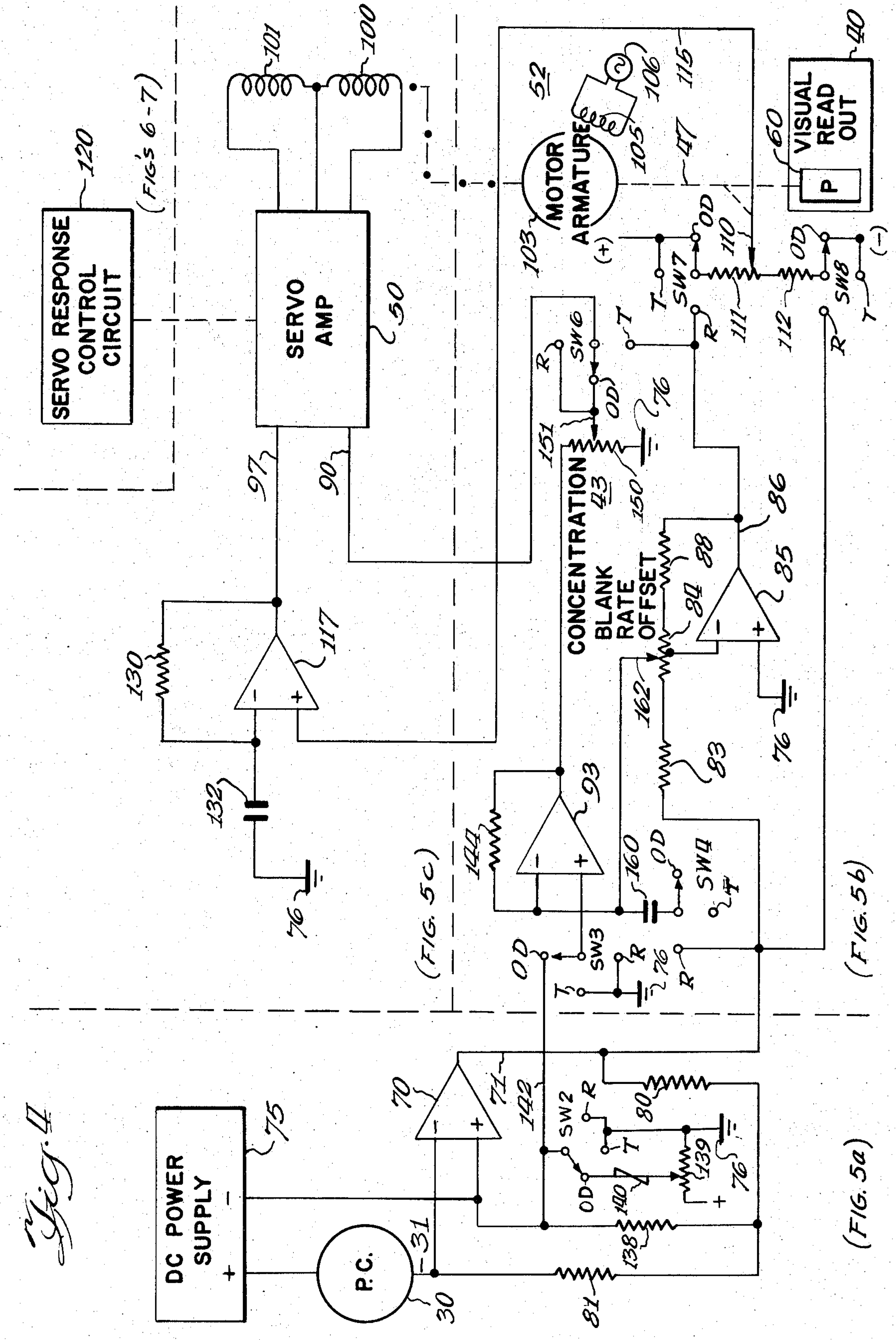
Fig. 4 (FIG. 5a) (FIG. 5b) (FIG. 5c) (FIG'S 6-7)

PHOTOMETRIC READ OUT AND ANALYZING SYSTEM

PHOTOMETRIC READ OUT AND ANALYZING SYSTEM

PHOTOMETRIC READ OUT AND ANALYZING SYSTEM

United States Patent Office 3,701,601 Patented Oct. 31, 1972

3,701,601

PHOTOMETRIC READ OUT AND ANALYZING SYSTEM

William H. Plumpe, Jr., and Theodore E. Weichselbaum, St. Louis, Mo., assignors to Sherwood Medical Industries, Inc.

Continuation of application Ser. No. 710,161, Mar. 4, 1968. This application Sept. 17, 1970, Ser. No. 73,269
Int. Cl. G01j *3/42, 3/46;* G06f *15/20*
U.S. Cl. 356—96 16 Claims

ABSTRACT OF THE DISCLOSURE

A servomechanism system coupled to a spectrophotometer provides direct read out of the transmittance of a solution being analyzed. Circuits selectively connectable in the system convert transmittance into the nonlinear functions of optical density, concentration and rate of chemical reaction, which are also directly read out by the servomechanism. Additional circuits provide noise suppression and cause the servomechanism to be responsive to the time duration an input is off null.

This application is a continuation of our copending application Ser. No. 710,161, filed Mar. 4, 1968, entitled "Read Out System," and now abandoned.

This invention relates to a read out system, and more particularly to a system for reading out quantities which have a nonlinear relation to the quantity being measured.

In analyzing chemical solutions, a spectrophotometer is commonly used to provide a reading of the transmittance or transparency of a solution to light energy of a selected frequency. By using tables and charts, the transmittance reading may be converted into other quantities useful in analyzing the solution, such as optical density and concentration, both of which bear a nonlinear relation to transmittance. In an attempt to simplify the analyzing process, a direct read out of optical density has to a crude extent been provided by nonlinear scale markings on the output meter of the spectrophotometer, or by circuits using the breakover characteristics of a semiconductor diode, which provide adequate readings but are greatly limited as to range.

However, for utilization by a variety of temporary and permanent read out devices, it is desirable to provide electrical signals representative of these nonlinear quantities, which are accurate over a substantial range of transmittance signals from the spectrophotometer. Furthermore, the system should allow an operator to enter information regarding known scale factors for the solution being tested, in order to provide a direct reading of concentration or the like.

In performing certain chemical analysis, it is desirable to determine the rate at which a chemical reaction is proceeding, such as the rate at which an enzyme is being used up by the solution. For example, a standard laboratory procedure for determining the amount of serum glutamic oxaloacetic transaminase (S.G.O.T.) has been to measure the enzyme reaction at spaced intervals of time, and then convert this data into a rate function. In some tests, the reaction is allowed to proceed and then is stopped or killed at specified time intervals. By measuring the degree to which the reaction had proceeded, the rate of chemical reaction can be calculated. Such a procedure is time consuming and provides rate information only at a few spaced time intervals. It would be desirable to provide a continuous direct reading of the rate of chemical reaction, without having to stop the reaction at any point.

The present invention provides all of the above desirable features in a direct read out system which shares portions of similar functioning circuits in common, producing an integrated system having a minimum number of components. The related quantities of transmittance, optical density, concentration and rate of chemical reaction can be directly read out by unskilled laboratory technicians, and with a high degree of accuracy.

One object of this invention is the provision of a system for reading out quantities which bears a nonlinear relation to quantities being measured.

Another object of this invention is the provision of a system which converts the output of a spectrophotometer into direct readings of transmittance, optical density, concentration and rate of chemical reaction.

One feature of this invention is the provision of a read out system for monitoring a quantity and converting the monitored quantity into a nonlinear function, by means of novel circuits which are adjustable to produce an electrical flow, over an extended range, of the same degree of nonlinearity as the function which is to be read out.

Another feature of this invention is the provision of a chemical analyzing system in which the rate of change of a measured quantity is calculated by a circuit comprised solely of linear functioning circuit elements.

Still another feature of this invention is the provision of a rate determining system which includes noise suppression means, and a servomechanism responsive to the time duration that a quantity is off null, rather than the magnitude by which the quantity is off null.

Further featuers and advantages of the invention will be apparent from the following description and from the drawings, in which:

FIG. 4 is an intermediate detail schematic diagram of the read out system of FIG. 1;

Figures 1, 2, 3:
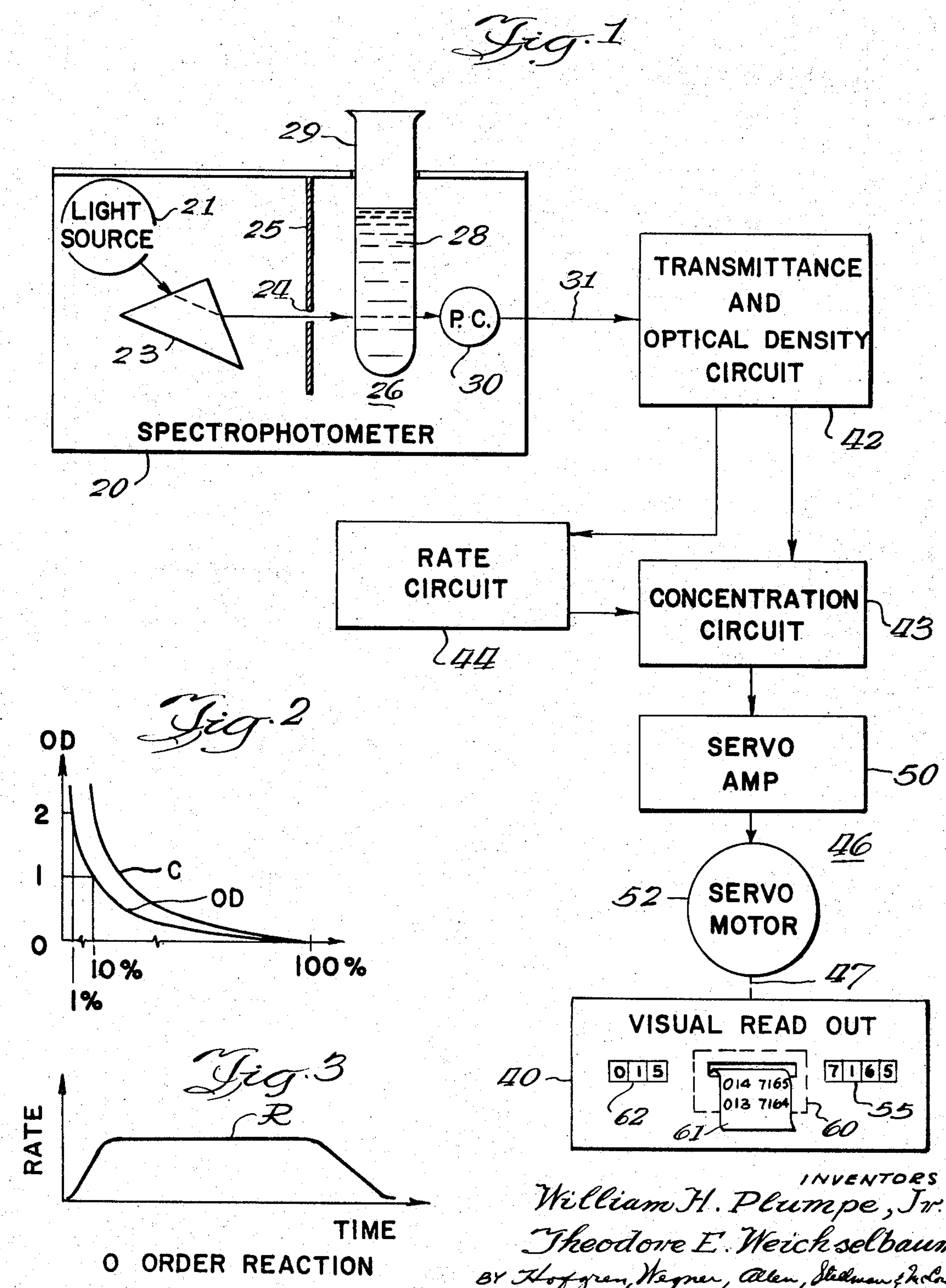
FIG. 1 is a block diagram of the read out system, as connected to a spectrophotometer.
FIG. 2 is a graph of the relation between the transmittance T, optical density OD, and concentration C of a solution.
FIG. 3 is a graph of rate of chemical activity of a zero order chemical reaction.

While an illustrative embodiment of the invention is shown in the drawings and will be described in detail herein, the invention is susceptible of embodiment in many different forms and it should be understood that the present discolsure is to be considered as an exemplification of the principles of the invention and is not intended to limit the invention to the embodiment illustrated. Throughout the specification, values and type designations will be given for certain of the components in order to disclose a complete, operative embodiment of the invention. However, it should be understood that such values and type designations are merely representative and are not critical unless specifically so stated. The scope of the invention will be pointed out in the appended claims.

GENERAL OPERATION

In FIG. 1, the novel read out system is shown connected to the output of a conventional spectrophotometer 20. The spectrophotometer 20 typically includes a source 21 of light energy, which passes through a prism 23 and thence through an opening 24 in a wall 25 into a chamber 26. A solution 28 to be analyzed, contained within a transparent test tube 29, is lowered into the chamber 26 into the path of light energy which is directed from opening 24 toward a photocell (PC) 30. The output line 31 from photocell 30 carries a signal having an amplitude which depends on the absorbance of solution 28 to the particular frequency of light energy passed through opening 24.

Prism 23 may be manually rotated in order to pass different portions of the spectrum, i.e., different frequencies of light energy, through opening 24 for passage through solution 28 before striking photocell 30. Different solutions have different degrees of absorbance for different frequencies of light energy, and by making a tabulation of the absorbance of solution 28 for light energy having a spectrum of different frequencies, or for certain crictical frequencies, the solution can be chemically analyzed. Typically, output line 31 is coupled to an electrically responsive meter to move a pointer arm past scale markings indicating the degree of transmittance or transparency of the solution to the light energy of selected frequency. This meter may have a nonlinear scale thereon to provide a rough indication of optical density or other quantities which bear a nonlinear relation to transmittance.

The reading from photocell 30 is normalized by controls (not illustrated) on spectrophotometer 20 which set a meter indication of "1" with no solution in test tube 29 or a blank solution containing all of the constituents, except the one to be measured, so that with the solution to be tested the amount of light energy reaching photocell 30 is proportionately less, and represents the transmittance T or transparency of the solution. Several important quantities in common use in chemical analysis are determined from the transmittance of a solution. Optical density, OD, is the common logarithm of the reciprocal of transmittance, thus $$OD=\log_{10}\frac{1}{T}$$

as can be seen from the curve in FIG. 2.

The concentration C of a solution may be determined by multiplying a method factor or a scale multiplier times the optical density of the solution. Thus the concentration is a curve similar to optical density, but offset therefrom by a multiplication factor, as illustrated in FIG. 2. By means of known tables, setting out the milligram concentration of specified solutions for specified values of optical density, the multiplication factor may be calculated to multiply all optical density readings by the same amount, thus providing direct read out of concentration.

Finally, the rate of chemical reaction R, is equal to the rate of change of optical density. In FIG. 3, a curve of rate of reaction is plotted for a zero order chemical reaction, such as the reaction used to calculate S.G.O.T. In a zero order reaction, as illustrated, the reaction proceeds at a constant rate except during the initial and final stages of the reaction. The determination of the rate of chemical reaction can be an important tool in analyzing the solution being tested.

Some of the above quantities have to a crude extent been automatically read out, or, when accuracy over an extended range is desired, have been calculated by hand or from mathematical tables listing optical density and concentration of a solution for given transmittance readings. The rate of chemical reaction has been calculated by taking the slope of the transmittance curve at spaced time intervals. Such procedures are time consuming and subject to error.

In accordance with the present invention, a read out system is connected to spectrophotometer 20 to provide a direct read out of any of these quantities on any suitable visual read out device 40, which may provide digital or analog representations. The read out system includes a transmittance and optical density circuit 42 connected to the output line 31 from photocell 30, and a concentration circuit 43 and a rate circuit 44 which may selectably be connected into the system when desired. These circuits provide signals which drive a servomechanism 46 having an output movement at a shaft 47 coupled to visual read out device 40. Servomechanism 46 includes a servo amplifier 50 which drives a servo motor 52 to produce a shaft rotation directly proportional to the desired quantity to be read out.

Any read out device 40 is suitable for use with the system, which can convert the movement of a shaft into a corresponding reading or indication for either temporary or permanent recordation. A suitable visual read out device 40 is the apparatus disclosed in a copending application of the applicants, entitled "Printing Apparatus," Ser. No. 702,581, filed Feb. 2, 1968, and assigned to the assignee of the present invention, to which reference should be made for a full explanation. In such a case, servo motor 52 may directly replace the servo motor in the copending application, which drives recording indicators. These indicators include wheels 55 having a digital reading which can be observed through a window in the device 40, and a print mechanism 60 which prints a permanent record on a recording medium 61. An additional indicator 62 records a separate number for each time a print operation is made, in order to aid an operator in logging the test result which is being printed.

GENERAL DESCRIPTION OF READ OUT SYSTEM

Turning to FIG. 4, the read out system of FIG. 1 is shown in intermediate detail. This system converts the output from photocell 30 into a movement of shaft 47 which drives a print mechanism 60 or other apparatus for producing a record therefrom.

A plurality of switches SW allow an operator to select a direct read out in transmittance T, optical density OD or rate R. A concentration C reading may be selected at any time that the switches SW are on an optical density position. In order to simplify FIG. 4, each switch SW is shown as an independent rotary switch for connecting a center terminal to any one of three outer terminals for selecting a T, OD or R operation for the system. When the system is to directly read out, for example, optical density, all switches SW are rotated so that all wipers connect the center terminals to the outer terminals labeled OD. As will appear with reference to FIG. 5, switches SW comprise a ten bank, ganged, multiple position rotary switch. Each bank is designated SW followed by a number corresponding to the position of the bank. Since all banks are ganged together, the operator need make only a single selection to automatically connect all switches to the same position.

A number of conventional operational amplifiers, illustrated by triangles, are used in the system. Each operational amplifier has a pair of input lines thereto, one of which is designated (−), and the other of which is designated (+). The output from an operational amplifier is a voltage proportional to the difference between the voltages on the (−) and (+) inputs thereto. Each operational amplifier has a high gain and an extremely high input impedance, which prevents loading the circuits connected to the input leads thereto. While operational amplifiers are disclosed, other differential devices having an output proportional to the difference between a pair of input signals thereto could be substituted for the operational amplifiers.

The system will first be described for directly reading transmittance. Switch SW2, when its wiper is connected to outer terminal T, connects an operational amplifier 70 as a current to voltage transducer for converting the photocell current on line 31 into a corresponding voltage on output line 71 from the operational amplifier. This circuit also maintains the same relative voltage across the photocell 30, to prevent nonlinearity as the amount of light energy striking the photocell varies.

The voltage for photocell 30, as well as for the remaining portion of the system, is provided by a DC power supply 75, having a plurality of positive (+) and negative (−) output voltages relative to a power supply reference voltage of zero volts. All of these voltages are floating with respect to the system reference potential, or system ground 76.

As photocell 30 is exposed to more light, the voltage on line 31 increases, and without compensation causes the relative amount of voltage across the photocell to decrease. The increased current from the photocell 30 causes the voltage on line 71 to increase proportionately, and this voltage is coupled by resistors 80 and 81 to line 31 to compensate for the increase and cause the total voltage across the photocell 30 to remain constant.

Line 71 is coupled by a resistor 83 and resistive network 84 to the (−) input of an operational amplifier 85. The (+) input of operational amplifier 85 is connected directly to ground 76. The output line 86 from operational amplifier 85 is coupled through a resistor 88, and the resistive network 84, to the (−) input, causing operational amplifier 85 to function as an inverter.

The voltage on line 71, which is proportional to the current from photocell 30, is equal to the transmittance T of the solution being analyzed. After being inverted by operational amplifier 85, the inverted transmittance signal on line 86 is coupled through SW6 to an input 90 of servo amplifier 50. A third operational amplifier 93 is disconnnected from the circuit at this time, since switch SW3 grounds the (+) input thereto, switch SW4 disables the (−) input thereto, and switch SW6 disconnects the output from the remaining circuit.

Servo amplifier 50 is a differential circuit having an output for driving servo motor 52 in proportion to the difference between signals at drive input 90 and a feedback input 97 thereto. In the illustrated embodiment of the invention, servo amplifier 50 controls the short circuiting of a pair of shading coils 100 and 101 of a bidirectional shaded pole motor 52 having an armature 103 and an AC field winding 105 continuously connected across a source 106 of AC voltage. When shading coil 100, for example, is shorted by servo amplifier 50, armature 103 rotates in one direction at full speed. Conversely, when shaded coil 101 is shorted by servo amplifier 50, armature 103 rotates at full speed in the opposite direction. To control motor speed, as explained in detail later, the shading coil corresponding to the desired direction of rotation is shorted, while the opposite shading coil is at times shorted in order to introduce a reverse or braking component which slows the rotation of armature 103 to less than full speed. While this method of speed control is desirable due to special advantages, other circuits for controlling the speed and direction of rotation of an output shaft 47 by an input signal could be substituted therefor.

Output shaft 47 of armature 103, which drives read out device 40, is also mechanically coupled to a wiper 110 of a potentiometer 111 used as the feedback device for the servomechanism. Switches SW7 and SW8 connect potentiometer 111 and a series connected resistor 112, for all readings other than rate, across equal positive (+) and negative (−) DC potentials, so that an end position of wiper 110 nearest resistor 112 produces zero volts, and corresponds to the null position of the servomechanism.

Wiper 110 is electrically coupled through a line 115 to the (+) input of an operational amplifier 117 having an output directly coupled to input 97 of servo amplifier 50. The servomechanism drives armature 103 and connected wiper 110 until the voltage at the wiper 110 equals or balances the voltage at input 90 of servo amplifier 50. When there is no signal at input 90, wiper 110 is driven to an end position of potentiometer 111, corresponding to zero volts. As the signal on input 90 varies from zero, the servomechanism responds to the unbalance by shorting the shading coil 100 or 101 to rotate the armature and wiper 110 and increase the voltage on the potentiometer, until the signal coupled to input 97 of servo amplifier 50 approaches and finally equals the voltage on input 90. The final rest shaft position corresponds to the amount of voltage on input 90, which in turn corresponds to the amplitude of the signal which the system has been selected to read out. Since shaft 47 is also coupled to visual read out device 40, a direct reading of the selected quantity is displayed at this time.

Extraneous electrical noise, which is especially troublesome when taking rapidly changing rate readings, may be coupled to inputs 90 and 97 of servo amplifier 50. Without special precautions, such noise signals would cause the servomechanism to respond by rotating the armature 103 a corresponding amount. To suppress the effects of noise, and for other important reasons discussed later, the normal operation of the servomechanism is modified by a circuit associated with operational amplifier 117, and by a servo response control circuit 120.

Most prior servomechanisms respond to the distance off null of the wiper of a feedback device. When the input signal to the servomechanism suddenly and substantially changes, a large driving torque is developed because the wiper is located a substantial distance from the new null position which must be reached. When large amplitude noise signals are received, the servo motor is forced to jump a correspondingly large distance, and the subsequent sudden cessation of the noise signal forces the servo motor to jump back towards its prior position, creating a violent swinging or oscillating motion.

To obviate this problem, the present servomechanism is responsive to the time duration that an input signal is off null, rather than distance off null. Operational amplifier 117 is connected both as a differentiator and as a follower which passes the DC feedback signal to input 97. The resulting signal at input 97 is a positional DC signal; summed with a rate of change signal. When the feedback input is far off null, the DC signal drives the servo motor at a maximum speed. As the feedback input approaches null, the DC signal is reduced and the direction of drive to the servo motor is determined by the ratio of DC to the rate signal. If the DC signal is small and the rate signal is large, such as occurs near null with the motor running full speed, the opposite polarity rate signal is dominant and the motor is reversed until slowed to a speed more commensurate with the distance off null. At null any momentary disturbance, such as would normally initiate a series of oscillations, is immediately cancelled by the high rate signal produced by the differentiator 117. This is essentially an electrical overshoot which anticipates the mechanical overshoot of the motor.

To connect operational amplifier 117 as both a differentiator and a follower, a feedback resistor 130 is coupled between the output of operational amplifier 117 and the (−) input thereto. The (−) input is also coupled through a capacitor 132 to ground 76. This circuit differentiates ground with reference to the signal on line 115, producing an output as though the signal on line 115 were differentiated with respect to ground, and also passes the DC feedback signal, since capacitor 132 is not seen in the static state of operation.

To further enhance noise suppression, and to control other conditions including motor speed, the servo response control circuit 120 is coupled to servo amplifier 50. Circuit 120 may take the form shown in FIG. 6, or when better control is desired, the form shown in FIG. 7, both to be explained later. Briefly, circuit 120 serves to cancel or short the noise spikes, and to make the servo amplifier responsive to the time duration of a signal off null, rather than distance off null. Also, the circuit allows a wide range of voltages to be applied across potentiometer 111. As will be explained later, such voltages are applied across the potentiometer when the system reads rate.

Returning to the example of directly reading transmittance, the inverted transmittance signal from operational amplifier 85 is coupled to input 90 of servo amplifier 50. This causes the servomechanism to respond, as generally described above for all types of input signals, producing a rest position of armature shaft 47 which directly corresponds with the transmittance of the solution. This value is directly read out by visual read out device 40.

When the transmittance signal from photocell 30 is to be converted and directly read out as optical density, all switches SW are moved to the OD position. SW2 inserts a resistor 138, a potentiometer 139, and a nonlinear resistor 140, as a varistor, in an electrical path which includes the (+) input of operational amplifier 70 and ground 76. Varistor 140 is a nonlinear functioning circuit element, namely, it does not exhibit constant resistance for equal changes in current or voltage. Rather, the resistance changes as the voltage changes. The voltage-current curve of the varistor follows a nonlinear path having a shape which the circuit associated with the varistor modifies until the curve of voltage versus current in the electrical path has the same degree of nonlinearity as the curve of OD illustrated in FIG. 2. This curve, however, is displaced from the position necessary to cause full output of photocell 30, i.e., 100% T, to occur at zero output voltage, i.e., correspond with zero OD. Potentiometer 139 shifts the operating point upward to cause the curve to cross zero at the desired point, as will be explained in detail with reference to FIG. 5A.

The output of the electrical path which includes varistor 140 is a line 142 which is coupled through the OD position of SW3 to the (+) input of operational amplifier 93. The voltage on line 142 is directly representative of the optical density of the solution being tested. Operational amplifier 93 is connected as a 1:1 voltage follower, by means of resistor 144 coupled between the output of the amplifier and the (−) input thereto.

The output of operational amplifier 93 is coupled to concentration circuit 43, which includes a potentiometer 150, one side of which is connected to ground 76. A wiper 151 of potentiometer 150 couples the resulting divided signal output through SW6 to input 90 of servo amplifier 50. Wiper 151 may be manually adjusted for multiplication factors of from zero to three. When optical density is to be read, wiper 151 is set at a scale factor or multiplier of one, and thus has no effect at this time. Operational amplifier 85, previously used for transmittance, is not effective in the circuit when reading optical density, since the OD position of SW6 disconnects the output of operational amplifier 85 from input 90.

The servomechanism is responsive to the signal on input 90 to drive the motor armature 103 by a corresponding amount, causing visual read out device 40 to have a reading which directly indicates the optical density of the solution in the spectrophotometer.

When the system is to read directly in concentration, wiper 151 of potentiometer 150 is moved to a corresponding scale factor or multiplier by which the optical density signal is to be multiplied to produce the value of concentration for the solution being tested. This signal is coupled to the servo amplifier 50 to cause motor armature 103 to rotate a corresponding amount and cause a direct read out of concentration on visual read out device 40.

When directly reading out rate of chemical reaction, which equals the rate of change of optical density, it is important that a continuous reading of the rate value be obtainable at all times. The desired rate signal often passes through several ranges of optical density, and if the circuit merely differentiated the optical density signal obtained above, it would be necessary to switch varistor 140 to new ranges, creating the possibility that critical readings would be lost during the switching period. This problem is eliminated by providing a continuous rad out, as distinguished from ranges of read outs; however, such requires the elimination of varistors, semiconductor junctions, and other nonlinear functioning elements. The applicants' invention computes the derivative of a nonlinear logarithmic function by using solely linear functioning circuit elements.

A linear element is one having constant resistance, constant inductance, or constant capacitance, regardless of current or voltage coupled thereacross. An element of a circuit includes resistors, inductors, and capacitors, i.e., the passive elements, and generators of constant voltage and constant current, i.e., the active elements. Varistor 140 and semiconductor junctions are examples of nonlinear circuit elements.

As used herein, the term linear functioning element is defined to be one or more elements whose output is a linear function, that is, the device would be considered a linear element if composed of a single component. Thus, a DC amplifier is a linear functioning element, although it may be composed of transistors and other elements which may not themselves be linear elements. When the system is switched to the rate reading portion, the circuit is composed solely of linear functioning elements, arranged to produce a rate reading without requiring a nonlinear functioning element, such as the varistor 140 used in the optical density portion of the circuit.

When rate is to be read, all switches SW are thrown to the R position. Switch SW2 disconnects varistor 140 from the circuit, and connects operational amplifier 70 in the same circuit used for transmittance. The output 71 of operational amplifier 70 is now the transmittance signal from photocell 30, coupled to both an R terminal of SW4, and through resistor 83 and resistive network 84 to operational amplifier 85.

Switch SW4 couples the transmittance signal through a capacitor 160 to the (−) input of operational amplifier 93. With capacitor 160 in the input line, and resistor 144 across the input and output, operational amplifier 93 functions as a differentiator, differentiating the transmittance signal with respect to time. The differentiated output is coupled to the potentiometer 150 of concentration circuit 43, which may be set to any multiplier in order to produce a read out directly in terms of a desired quantity, as rate of change of OD or rate of change of concentration. The circuit 43 in turn is coupled through the R position of switch SW6 to input 90 of servo amplifier 50.

The chemical reaction being monitored may proceed, without a catalyst, at a rate of chemical activity which should be subtracted from the rate with a catalyst to determine the effect of the catalyst on the solution. In order to subtract or blank out such a rate of chemical activity, resistive network 84 forms a divider having a wiper 162 which is coupled to the (−) input of operational amplifier 93. By adjusting wiper 162, a positive or negative amount of the transmittance signal is transmitted to the (−) input of operational amplifier 93 to subtract from the transmittance signal coupled thereto by means of SW3. Thus, wiper 162 of resistive network 84 forms a blank rate offset control for reducing the rate reading by an amount selectable by an operator.

The transmittance signal on line 71 is also coupled across potentiometer 111 during a rate reading. More particularly, an inverted transmittance signal from operational amplifier 85 is coupled to the R terminal of switch SW7, while the R terminal of switch SW8 is directly coupled with line 71. Resistor 112 drops the transmittance signal so that zero remains at the same point on potentiometer 111. Potentiometer 111, previously connected across a constant value of DC voltage, is now coupled across the transmittance signal voltage which has a wide range of values with changes in the light transmitting properties of the solution. Since the time derivative of the transmittance signal (at input 90) divided by itself (the transmittance signal coupled across potentiometer 111) is the rate of change of optical density, the final rest position of shaft 47 is the derivative of optical density, i.e., the rate of chemical reaction. Although the circuit uses solely linear functioning elements, the final rest position of shaft 47 is the rate reading, coupled to read out device 40.

The rate reading circuit can be used to determine the shape of the rate curve, regardless of the order of the chemical reaction. If, for example, the solution is being analyzed for S.G.O.T., the reading on device 40 rises to a constant value and in the final stage of the reaction drops to zero, as seen in FIG. 3. This type of curve indicates a zero order chemical reaction has occurred.

While the rate system has been described for rate of change of optical density, it is possible that rate of change of other mathematical quantities could be accomplished in the same manner. That is, the time derivative of a signal can be coupled to input 90, and divided by itself by coupling the signal across potentiometer 111. In this manner, rate of change of nonlinear quantities can be determined solely by linear functioning elements.

DETAILED DESCRIPTION OF READ OUT SYSTEM

Figure 5A:
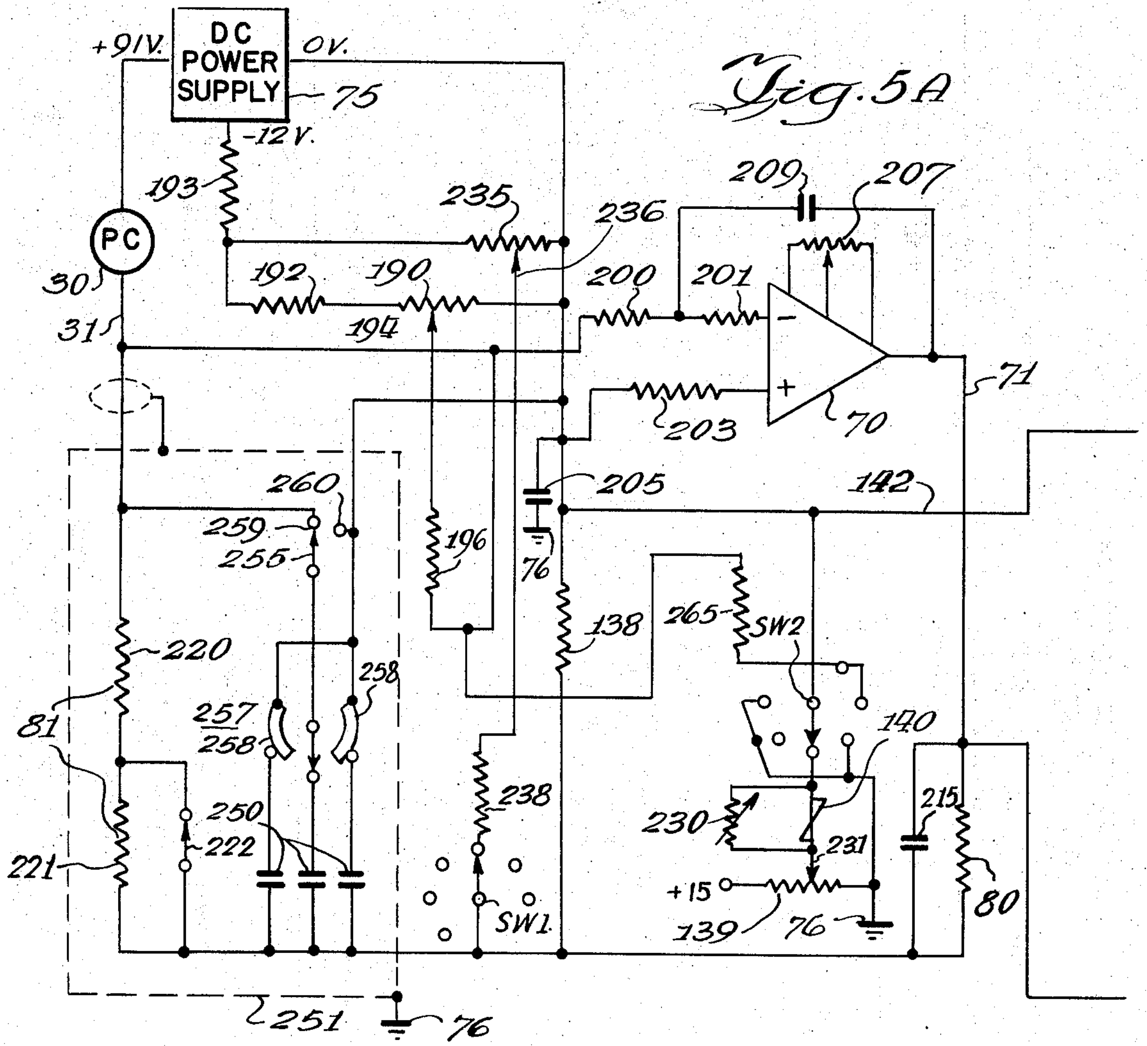
FIGS. 5A, 5B and 5C are detailed schematic diagrams of the read out system illustarted in FIG. 4.
Figure 5B:
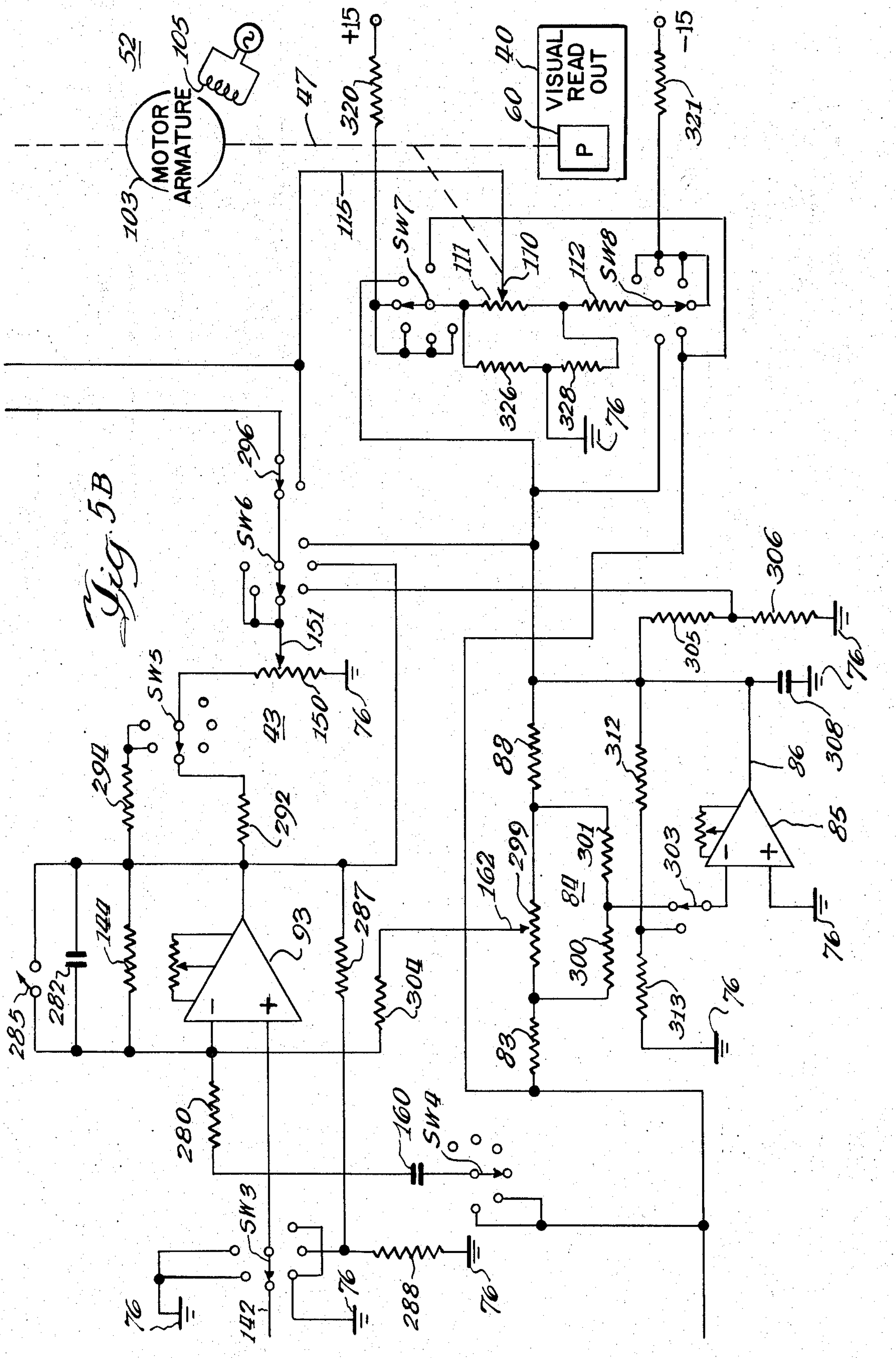
Figure 5C:
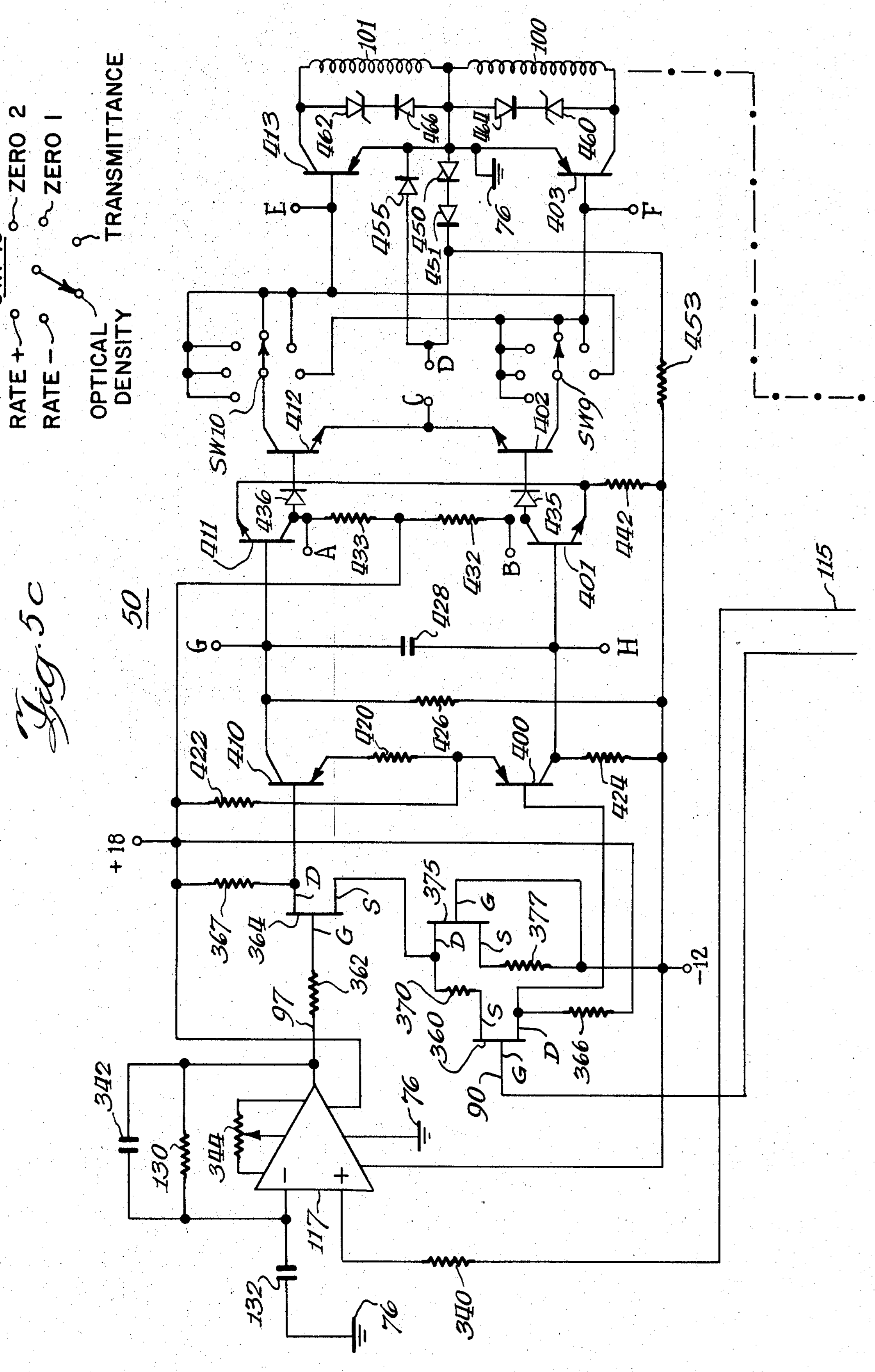

Turning to FIG. 5, the read out system of FIG. 4 is shown in detail. Throughout FIGS. 5A, 5B and 5C, the switches SW are each illustrated following the key diagram shown on the upper right hand portion of FIG. 5C. Each switch is one of ten identical banks, designated as SW followed by a number indicating the bank. All terminals on each bank are arranged in the manner shown in FIG. 5C, namely, reading in a clockwise direction, the terminals correspond to zero 2, zero 1, transmittance, optical density, rate minus, and rate plus. The wipers of all banks are ganged together, however, to prevent undue complication to the drawings, the ganged connections for the ten banks are not illustrated.

Switches SW allow the operator to select the transmittance and optical density readings previously discussed. Separate rate readings are provided for both positive and negative going reactions. That is, a chemical reaction may cause a solution to become more opaque, hence continuously blocking more light energy, or may cause the solution to become progressively more transparent, hence allowing a greater quantity of light energy to reach the photocell 30. The extra rate control merely provides a 180° polarity shift when the chemical reaction is going in an opposite direction, to allow the read out to progress in the same direction from the zero position of the potentiometer 111, FIG. 5B. The zero 1 and zero 2 terminals connect the servomechanism to the output of selected operational amplifiers and essentially shorts the inputs thereof in order to aid in nulling the amplifiers to zero.

In FIG. 5A, the circuits including photocell 30, operational amplifier 70, and varistor 140 are shown in detail. Photocell 30 may be a photodiode, as RCA type 4409, or other light responsive element in a conventional spectrophotometer. One side of this element is connected to a positive source of DC potential, as +91 volts from DC power supply 75, while the opposite side, line 31, is coupled through a pair of 2.0 megohm resistors 200 and 201 connected in series with the (−) input of operational amplifier 70. The (+) input of operational amplifier 70 is coupled through a 2.0 megohm resistor 203 to a 0 volt output line from DC power supply 75. This 0 volt line is bypassed to system ground 76 by a 2.0 microfarad capacitor 205. Operational amplifier 70 includes a conventional balance or null control 207 for adjusting the output voltage on line 71 to zero when the input voltages to the (−) and (+) inputs are equal. For noise suppression, a 47 picofarad capacitor 209 is coupled between the output of operational amplifier 70 and the junction between resistors 200 and 201.

The resistance of photocell 30 is not infinite even when the photocell is dark. Thus, photocell 30 normally has some output even when the solution 28 is completely opaque. To balance or null this current, a dark current adjust control 190 provides an adjustable amount of voltage to buck the current output from photocell 30. More particularly, control 190 consists of a 10 kilohm potentiometer, connected in series with an 80 kilohm resistor 192 and a 470 kilohm resistor 193, coupled between the 0 volt DC output of power supply 75 and a −12 volt DC output therefrom. A wiper 194 on potentiometer 190 provides various amounts of negative voltage for bucking the dark current from photocell 30. This negative voltage is coupled through a 44 megohm resistor 196 to output line 31 of the photocell.

Operational amplifier 70 performs a current-to-voltage transformation for transmittance and rate readings. The output 71 from operational amplifier 70 is coupled through a resistor 80, as 56 kilohms, bypassed by a 0.01 microfarad capacitor 215, to the junction between resistor 81 and resistor 138, as 14 kilohms. Resistor 138, which functions like a load for operational amplifier 70, in turn is directly connected to line 142 and to ground 76 by SW2. Resistor 81 is formed in two sections, consisting of a 10 megohm resistor 220, and a 90 megohm resistor 221 which may be shunted by closing a single-pole single-throw switch 222. When switch 222 is opened, the current through resistors 81 is ten times different than when the switch is closed, to provide two decade ranges of optical density.

When the system is to read out optical density, switch SF2 connects varistor 140 between line 142, and through potentiometer 139 with ground 76. Varistor 140, shunted by a variable trimmer resistor 230, 1.0 megohms, is directly connected to a wiper 231 on the potentiometer 139, which may consist of a 2.0 kilohm resistor coupled between ground 76 and +15 volts DC potential. Potentiometer 139 forms a portion of a control for insuring that output line 142 carries a signal having a curve which matches the logarithmic optical density curve. The other portions of the control include trimmer resistor 230, and a 100 kilohm potentiometer 235 connected between the 0 volt output of DC power supply 75 and the junction between resistors 192 and 193. Wiper 236 on potentiometer 235 couples an adjustable amount of minus DC potential through a 200 kilohm resistor 238 to the junction line between resistors 80, 81 and 138.

When operating in the optical density mode, the previous voltage to current transformation is changed to a current to current transformation due to resistor 138 which forces a voltage through the (−) input of operational amplifier 70 which is proportional to the ratio of resistor 138 to resistor 81. This voltage produces a current which flows through varistor 140, to introduce the nonlinear relation necessary to produce the optical density reading on line 142.

However, a varistor has a curve which approximates a quadratic rather than a logarithmic function. Trimmer resistor 230 serves to warp the curve to produce more of a logarithmic shape at the top portion. Since varistor 140 has a high resistance at low current, the high resistance of trimmer resistor 230 has little effect at the bottom of the curve. To further shape the curve, potentiometer 235 is adjusted to shift the curve relative to the cross over point with zero voltage. At 0% transmittance, the varistor 140 produces zero voltage. Since the optical density curve has zero voltage at 100% transmittance, it is necessary to shift the whole curve upward. Potentiometer 139 is adjusted to add sufficient positive voltage to line 142 to cause zero volts output to occur at 100% transmittance. By adjusting the values of potentiometers 139, 230 and 235, the voltage-current curve of varistor 140 may be shaped to produce a curve which matches the logarithmic optical density curve.

Switch 222 when opened increases the voltage across resistors 81 by an order of ten, in order to increase the voltage across resistor 217 by ten times and shift the operating point of varistor 140. When switch 222 is closed, an optical density reading of from zero to one is provided, and when the switch 222 is opened, an optical density range from one to two is provided (since optical density is a logarithmic function, an increase of one corresponds to a times ten multiplier). These two ranges of optical densities are adequate for most chemical analysis, however, if additional ranges are desired, they can be provided by inserting additional resistors in series with resistors 220 and 221.

When the system is switched to read rate, noise from photocell 30 becomes a critical porblem. In order to eliminate flicker noise, the output of photocell 30 is integrated prior to being coupled to the differentiator formed by operational amplifier 93 of FIG. 5B. For this purpose, any one of a plurality of capacitors 250, maintained within a shielded housing 251 coupled to ground 76, may be coupled through a single-pole double-throw switch 255 to resistors 200 and 201 connected with the (−) input of operational amplifier 70. The time constant of the circuit depends upon the amount of capacitance, and different value capacitors 250 may be selected by a switch 257.

If the capacitor 250 selected by switch 257 was to be connected uncharged to the (−) input of operational amplifier 70, the short amount of time necessary to charge the capacitor would cause the rate reading to be temporarily lost. To obviate this problem, the unselected capacitors are coupled together through rings 258 of switch 257 to the (+) input of operational amplifier 70. Since the voltage at the (+) input is forced to be the same as the voltage at the (−) input, the unselected capacitors are charged to approximately the same value required when in the future they are connected by the wiper of switch 257 with the (−) input of operational amplifier 70.

Sometimes, as when a new rate reading is initiated, the capacitors 250 connected to the (−) input of operational amplifier 70 may have a substantially different charge than the new value required. The switch 255, which is normally connected to a contact 259 for connecting the selected capacitor to the (−) input of operational amplifier 70, may be momentarily thrown to a terminal 260 which connects the selected capacitor to the (+) input of operational amplifier 70. Since the circuit of the (+) input has a much lower impedance than the circuit of the (−) input of operational amplifier 70, the capacitor quickly charges to approximately the desired value, and upon release of switch 255 is connected in circuit without any further delay necessary to charge the capacitor 250. Capacitor 215 prevents the circuit from being a lag network when capacitors 250 are connected to the operational amplifier 70, to prevent system oscillation.

For purposes of making the zero adjustments, the zero 1 and zero 2 terminals of switch SW2 are connected through a resistor 265 with line 31 from the photocell 30.

In FIG. 5B, the circuits including operational amplifiers 85 and 93, the concentration circuit 43, and the circuit of feedback potentiometer 111 are shown in detail. Operational amplifier 93 is a 1:1 voltage follower for optical density, and is a differentiator for rate readings, formed by capacitor 160, as 10 microfarads, acting with resistor 144, as 7 megohms. A 30 kilohm resistor 280 is coupled between capacitor 160 and the (−) input of operational amplifier 93. Also, a 0.0047 microfarad capacitor 282 shunts resistor 144. Resistor 280 and capacitor 282 serve to discriminate against high frequencies, in order to eliminate noise spikes.

During the differentiating process, capacitor 160 is charged to some value. After a rate reading has been completed, a normally open single-pole, single-throw switch 285 may be closed to discharge capacitor 160, thus resetting the rate to zero. However, a previous charged capacitor normally returns, after a discharge, to some voltage charge due to the dielectric properties of the capacitor. Therefore, capacitor 160 is a polycarbonate capacitor, or a Teflon capacitor, in order that after switch 285 is opened, the capacitor will remain at zero charge. Finally, for zeroing purposes, a series connected 10 kilohm resistor 287 and a 100 kilohm resistor 288 are connected between the output of operational amplifier 93 and the ground 76. The junction of resistors 287 and 288 are connected to the zero 1 terminal of switch SW3.

Concentration circuit 43 consists of a 260 kilohm optical density calibration resistor 292 in series with 100 kilohm potentiometer 150, coupled between the output of operational amplifier 93 and ground 76. During rate readings, resistor 292 is replaced by a rate calibration resistor 294, which may have a value from several ohms to 10 kilohms. A double-pole single-throw switch 296 normally connects input 90 of servo amplifier 50, FIG. 5C, to the wiper of switch SW6. However, for zeroing purposes, switch 296 may be thrown to its other position to short together input 90 and the (+) input of operational amplifier 117, FIG. 5C.

Operational amplifier 85 serves as an inverter for passing transmittance to the input 90 of servo amplifier 50 of FIG. 5C, and for providing an inverted transmittance signal to SW7 for connection across potentiometer 111. Resistors 83 and 88 may each be 5 kilohms. Resistive network 84 may be formed by a center tapped potentiometer, or as illustrated by a 5 kilohm potentiometer 299 shunted by a pair of series connected 2.2 kilohm resistors 300 and 301, the junction therebetween being coupled through a double-pole single-throw switch 303 to the (−) input of operational amplifier 85. Wiper 162 of potentiometer 299 is coupled through a 2.4 megohm resistor 304 to the (−) input of operational amplifier 93, for blank rate offset as previously described.

The output 86 of operational amplifier 85 is coupled to ground 76 through a pair of series connected 40 kilohm and 10 kilohm resistors, 305, 306 respectively. These resistors are bypassed to ground 76, for noise elimination, by a 0.02 microfarad capacitor 308. The junction between resistors 305 and 306 is connected to the transmittance terminal of switch SW6. For zeroing purposes, output 86 is coupled to ground 76 through series connected 50 kilohm and 1.0 kilohm resistors 312 and 313, respectively. The junction between resistors 312 and 313 is coupled to a terminal of switch 303, for connecting this voltage divider to the (−) input of operational amplifier 85.

Feedback potentiometer 111 and resistor 112 are coupled through switches SW7 and SW8 to +15 and −15 volts DC potential (except during rate readings), by resistors 320 and 321 respectively. During rate readings potentiometer 111 may have either a positive or negative transmittance signal thereacross, which usually will continuously change in value.

As wiper 110 is moved across the windings on the potentiometer, the resistance momentarily increases by steps as the wiper spans adjacent windings. Since the system has a fast response time, these momentary changes in resistance could create false servo movement. Such is obviated by the differentiating circuit of operational amplifier 117 and the servo response control circuit 120, previously briefly described. The detailed manner in which these circuits operate to overcome the problems of a wire wound potentiometer 111 are discussed later.

With most potentiometers, the resistance region around the end tabs thereof are nonlinear or otherwise of unreliable value. In order to move zero off the end tabs, to insure that the system has linear movement through zero, and in fact a short distance below zero, a network places zero volts a short distance from the end tab nearest resistor 112. Potentiometer 111 may be of 100 kilohm resistance. The network includes resistor 112, as 10 kilohms, connected in series with potentiometer 111. In addition, potentiometer 111 is shunted by series connected resistors 326 and 328, 10 kilohms and 100 ohms, respectively. The junction between resistors 326 and 328 is directly connected to ground 76. The network of resistors 112, 326 and 328 moves the zero point of potentiometer 111 a short distance off the end tab nearest resistor 112. This network is symmetrical, so that when either positive or negative value signals are coupled across potentiometer 111, zero volts remains at the same wiper position.

In FIG. 5C, circuits including operational amplifier 117 and servo amplifier 50 are shown in detail. The lines leading to lettered terminals are for connection to servo response control circuit 120, which may take either the form shown in FIG. 6 or in FIG. 7, to be described later.

Operational amplifier 117 differentiates the signal on line 115, which is coupled through a 10 kilohm resistor 340 to the (+) input of operational amplifier 117. The (−) input is coupled through capacitor 132, as 0.07 microfarad, to ground 76. Capacitor 132, with resistor 130, of 300 kilohm, shunted for noise elimination by a 0.01 microfarad capacitor 342, form a differentiator which differentiates ground with reference to the input signal at the (+) input, producing a signal on line 97 which has the same form as though the signal at the (+) input was itself differentiated. This circuit also passes the DC signal at the (+) input to input 97. A zero control 344 is provided for the operational amplifier 117.

Servo amplifier 50 consists of a differential or push-pull circuit having extremely high input impedances at inputs 90 and 97. Input 90 is coupled to the gate G of a field-effect transistor (FET) 360, as type 2N3955. Similarly, input 97 is coupled to the gate G of a FET 364, through a 10 kilohm resistor 362 to protect the FET's. The drains D of both FET's 360 and 364 are coupled through 50 kilohm resistors 336 and 367 respectively to +18 volts DC potential. The sources S of both FET's 360 and 364 are coupled to each other through a common resistor 370. The junction between resistor 370 and the source S of FET 364 is coupled to the drain D of a FET 375, whose gate G is coupled directly to a −12 volts DC potential. The source S of FET 375 is coupled through a 2 kilohm resistor 377 to the −12 volt DC potential.

FET's 360 and 364 each form the input stage of the push-pull circuit, which includes cascaded transistors 400, 401, 402 and 403, coupled between FET 360 and shaded pole winding 100, and cascaded transistors 410, 411, 412 and 413, coupled between FET 364 and shaded pole winding 101. The voltage difference between the signals coupled to FET's 360 and 364 cause either shading coil winding 100 or 101 to be shorted by transistor 403 or 413, respectively.

The drains D of FET's 360 and 364 are directly coupled to the bases of transistors 400 and 410, respectively. FET's 360 and 364, having their sources S coupled together through a common source resistor 370, form a differential or push-pull circuit. The current through the two FET's flows through FET 375 and resistor 377 to the −12 volt DC potential. FET 375 shifts the ground point of the system, adjusting the bias on FET's 360 and 364 to keep the sum of the currents constant, providing the current swing required by the signals does not exceed the voltage available from the DC power supply.

This circuit allows differential sensing of the two signals to inputs 90 and 97, with both signals referenced to ground, thereby eliminating common mode noise problems, and further keeps the FET's 360 and 364 operating at the same point across the input voltage range, providing bias control with no connection to the gates G thereof which would undesirably lower the input impedance. This allows the gates G of FET's 360 and 364 to be slightly negative to the sources S at all times, giving good gain with minimum leakage. The servo amplifier 50 is thus designed to handle the wide voltage swings which may exist across potentiometer 111 of FIG. 5B when connected in the rate circuit.

Transistors 400 and 401, and corresponding transistors 410 and 411, are complementary types, allowing high DC gain without requiring continuously increasing DC supply potentials. PNP transistors 400 and 410 each have their emitters coupled to a common emitter resistor 420, as 680 ohms. The junction between resistor 420 and the emitter of transistor 400 is coupled through a 4.7 kilohm resistor 422 to the +18 volts DC. The collectors of transistors 400 and 410 are coupled through 15 kilohm resistors 424 and 426 respectively, to the −12 volts DC potential. A 0.47 microfarad capacitor 428 shunts the collectors of transistors 400 and 410. Transistors 400 and 410 form a push-pull circuit for amplifying the input signals from the FET's to drive transistors 401 and 411. The common emitter resistor 422 keeps transistors 400 and 410 operating as differential pairs, rather than as a single ended amplifier, providing negative feedback on common mode noise and on temperature drift.

Transistors 401 and 411 form the complementary pairs for transistors 400 and 410, respectively. The collector of transistors 401 and 411 are each connected to a 2.0 kilohm resistor 432 and 433, respectively, the junction therebetween being connected to +18 volts DC. The collectors are also coupled through diodes 435 and 436 to the base of transistors 402 and 412 respectively. The emitters of transistors 401 and 411 are connected together and through a 1.5 kilohm resistor 442 to −12 volts DC.

Transistors 402 and 412 respectively drive transistors 403 and 413, which operate in a bidirectional mode of operation, in order to short the shading coil 100 or 101. The emitters of transistors 402 and 412 are connected together and to a terminal C, used in the servo response control circuit 120. In the circuit 120, FIG. 6, terminals C and D are directly shorted together, whereas in the circuit 120 of FIG. 7, a transistor serves as a variable short across these terminals. The collector of transistors 402 and 412 is directly coupled to the base of transistors 403 and 413 respectively. When reading negative rate, switches SW9 and SW10 reverse the channels by 180°, so that transistor 413 is driven by transistor 402, while transistor 403 is driven by transistor 412.

Transistors 403 and 404 have their collectors and emitters coupled directly across the shading pole coils 100 and 101. The emitters are also coupled through a pair of similarly poled diodes 450 and 451 and through a 2.2 kilohm resistor 453 to the −12 volts DC potential source. Diodes 450 and 451 are shunted by an oppositely poled diode 455. Diodes 450, 451 and 455 may be type 1N3195. The junction between the emitters of transistors 403 and 413 is coupled to ground 76.

When transistors 403 or 413 are cut off, the inductance of coils 100 and 101 causes a ringing or noise effect. To suppress this noise, Zener diodes 460 and 462, type 1N4755, are coupled between the collector and emitters of transistors 403 and 413 respectively. To block current flow in the forward direction through the Zener diodes, but allow conduction in the reverse breakover direction, a pair of diodes 464 and 466 are connected between the emitter electrodes and each of the Zener diodes.

Transistors 403 and 413 operate as AC switches which variably short the AC output of the shading coils 100 and 101, in order to rotate the servo motor in the direction corresponding to the shorted shading coil. One of these transistors may continuously short a shading coil while the other may intermittently short the shading coil, in order to provide braking for controlling motor speed. The operation of transistors 403 and 413 will be explained later with reference to the servo response control circuit 120 of FIG. 7, which controls the operation of the servo amplifier 50 of FIG. 5C.

SERVO RESPONSE CONTROL CIRCUIT OF FIG. 6

Figure 6:
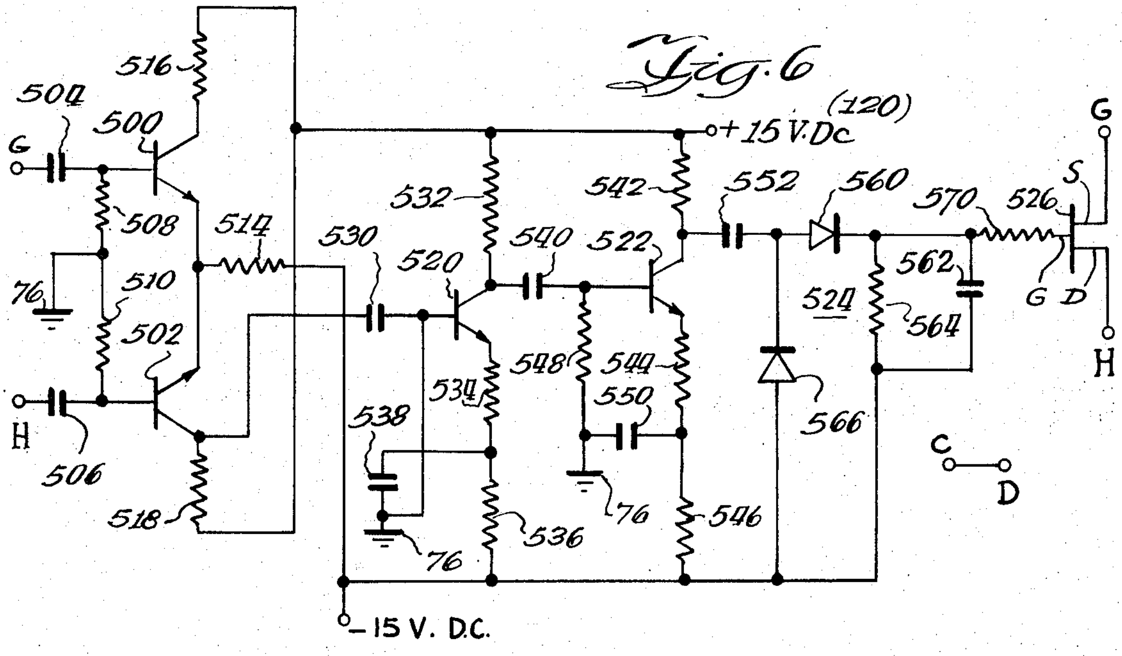
FIG. 6 is an embodiment of a servo response control circuit for the read out system.

The servo response control circuit 120 illustrated in FIG. 6 provides a variable short across the gain of the servo amplifier 50 of FIG. 5C. The input lines of the noise cancellation circuit are connected to terminals G and H, and operate in response to a sudden change in signal to provide a variable short across the same terminals G and H, thus immediately lowering the gain and preventing the signal from driving the remaining transistors in servo amplifier 50. This circuit serves to cancel noise, and also allows the servo amplifier to be run at high gain, without overdriving the amplifier or creating servomechanism oscillations due to wide voltage swings which may occur across potentiometer 111 of FIG. 5C when connected in the rate circuit.

Turning to FIG. 6, a pair of NPN transistors 500 and 502, as 2N3391, have their bases AC coupled through a 0.1 microfarad capacitor 504 and 506 to the G and H terminals, respectively. Each base is coupled through a 29 kilohm resistor 508, 510 to ground 76. The emitters of resistors 500 and 502 are coupled together and through a common emitter resistor 514, 10 kilohms to a source of −15 volts DC potential. The collector of resistor 500 is coupled through a 10 kilohm resistor 516 to a source of +15 volts DC potential. Similarly, the collector of transistor 502 is coupled through a 10 kilohm resistor 518 to the same +15 volts DC potential. Transistors 500 and 502 form a differential sensing circuit, with only one side being used as an output.

A pair of cascaded NPN transistors 520 and 522, type 2N3391, couple any change in voltage, from differential operating transistor 502, to an integrator 524 for turning on a FET 526. The FET then shorts terminals G and H in proportion to the amount of drive signal coupled thereto, and causes the signal difference to be dissipated. Transistor 520 has its base coupled through a 0.2 microfarad capacitor 530 to the collector of transistor 502. The collector of transistor 520 is coupled through a 10 kilohm load resistor 532 to the (+) DC potential. The base of transistor 520 is coupled through a pair of series connected resistors 534 and 536, 620 ohms and 20 kilohms respectively, to the (−) DC source. The base of transistor 520 is directly connected to ground 76, while the junction between resistors 534 and 536 is coupled through a 5.0 microfarad capacitor 538 to ground 76.

Another stage of AC amplification, similar to that provided by transistor 520, is provided by transistor 522. Like transistor 520, the collector of transistor 522 is connected through a 10 kilohm load resistor 542 to the (+) DC source, and the emitter is coupled through a pair of series connected resistors 544 and 546, 1.6 and 20 kilohms respectively, to DC potential. A 0.2 microfarad capacitor 540 couples the base of transistor 522 to the collector of transistor 520. The base is also coupled through a 100 kilohm resistor 548 to ground 76, while the junction between resistors 544 and 546 is coupled through a 5.0 microfarad capacitor 550 with ground 76. A 0.1 microfarad capacitor 552 couples the voltage at the collector of transistor 522 to the integrator circuit 524.

In operation, transistors 520 and 522 form AC coupled amplifier stages, in which capacitors 538 and 550 serve to increase the AC gain of the cascaded stages by shorting the AC to ground, thus bypassing the resistance of resistors 536 and 546. As the signal suddenly changes in value at either terminal G or H, relative to the signal at the other terminal, such as caused when the wiper 110 of potentiometer 111, FIG. 5B, moves between adjacent potentiometer windings, transistor 520 is biased into conduction, causing transistor 522 to be biased into conduction, in order to couple a voltage to the integrator circuit 524.

Integrator 524 includes a diode 560 poled to charge an integrating capacitor 562, 0.1 microfarad, coupled across a discharging resistor 564, 44 megohms. A second diode 566 allows negative going voltages from the collector of transistor 522 to be dissipated, without causing capacitor 562 to be charged. Thus, only positive going signals charge capacitor 562. This charge is coupled through a resistor 570 to the gate G of FET 526, biasing the FET into conduction and causing a variable impedance across the source S and drain D electrodes thereof, thereby connecting terminals G and H of FIG. 5C through the impedance of the FET in order to dissipate the signal which activated the circuit.

As the signal changes less rapidly, less signal is coupled by capacitors 504 and 506 to the differential circuit which drives cascaded transistors 520 and 522, causing a smaller signal to be passed by diode 560 to integrating capacitor 562. As a result, capacitor 562 is allowed to discharge across resistor 564 at a faster rate than the signal through diode 560 can charge the capacitor, and the decreasing voltage becomes insufficient to continue to bias FET 526 into conduction. The FET now turns off, and forms essentially an infinite impedance across terminals G and H. It should be noted that the circuit is only effective for signals of rapidly changing value, due to the AC coupling of the circuit. This eliminates rapid fluctuations which would undesirably cause the servomechanism to oscillate rapidly around null, while not affecting signal changes of longer duration which are meant to drive the servomechanism to a new position.

SERVO RESPONSE CONTROL CIRCUIT OF FIG. 7

Figure 7:
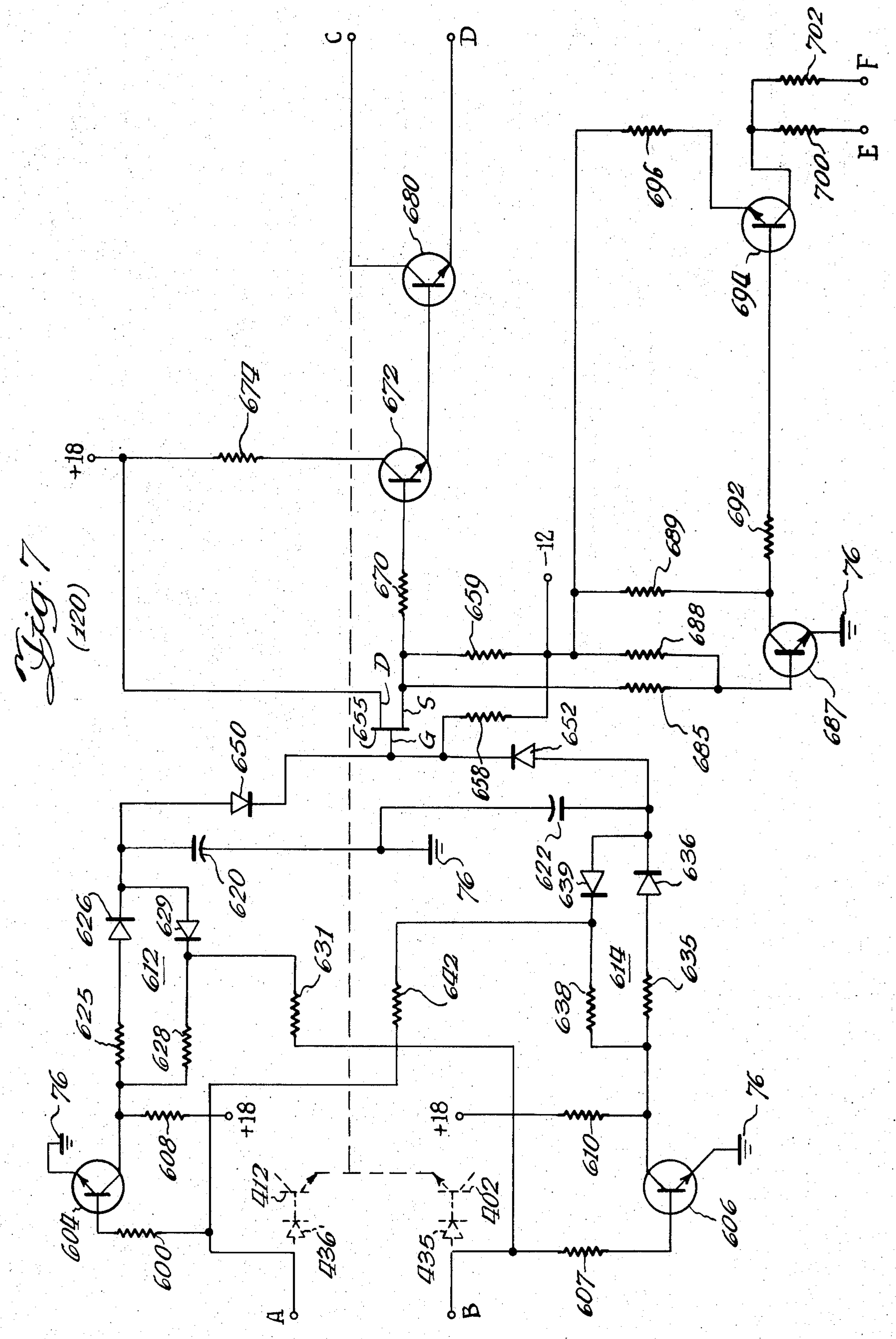
FIG. 7 is an alternate embodiment of a servo response control circuit for the read out system.

The servo response control circuit 120 of FIG. 7 may be used in place of the circuit of FIG. 6. This circuit effectively cancels noise, such as caused when the wiper of the feedback potentiometer is stepped to the next wire, and further provides smoother control over the speed of the servomechanisms near null positions than does the circuit of FIG. 6. The lettered terminals of FIG. 7 connect to the lettered terminals shown in FIG. 5C; and the circuit elements illustrated in dotted lines in FIG. 7 represent elements shown in FIG. 5C, which have again been illustrated to help explain the operation of the circuit.

The circuit 120 of FIG. 7 senses the signals to the bases of transistors 402 and 412, and in response thereto shorts terminals C and D together, allowing either of the transistors 403 or 413 of FIG. 5C to turn on, depending on which is being driven on by the servo amplifier circuit of FIG. 5C, and cause the servo motor to have full drive in that direction. Also, the circuit 120 supplies current to the bases of transistors 403 and 413 of FIG. 5C by way of terminals E and F, causing the transistor 403 or 413 which is not being driven on to nevertheless conduct by a variable amount. This supplies a braking action by shorting a portion of the AC of the shading coil corresponding to the opposite direction to which the motor is turning. Most of the AC from the shading coil is shorted when the input signals to the servo amplifier are of approximately the same amplitude, i.e., near null, and is continuously reduced as the signals become disproportionate, until completely disabling the back drive to allow the servo motor to run at full speed. This produces a servo which is proportional in speed to the duration of the off null signal, rather than to the magnitude of the signal.

More particularly, terminals A and B are coupled through 100 kilohm resistors 600 and 602 to the base of NPN transistors 604 and 606 respectively, which may be typed 2N3391. The emitters of transistors 604 and 606 are directly connected to ground 76, while the collectors thereof are respectively coupled through 30 kilohm load resistors 608 and 610 to +18 volts DC potential. Transistors 604 and 606 serve as switching transistors, as will appear, to cause charging circuit 612 or 614 to charge 10 microfarad capacitors 620 and 622 associated therewith.

Charging circuit 612 consists of a 100 kilohm resistor 625 and a series connected 1N3195 diode 626 connected between the collector of transistor 604 and capacitor 620. This path is shunted by another 100 kilohm resistor 628 in series with a 1N3195 diode 629 poled oppositely to diode 626, connected between the collector of transistor 604 and capacitor 620. The opposite side of capacitor 620 is connected directly to ground 76. A 62 kilohm resistor 631 connects the junction between resistor 628 and diode 629 to terminal 80.

Charging circuit 614 for capacitor 622 is similar to the charging circuit 612 for capacitor 620. A 100 kilohm resistor 635 in series with a 1N3195 diode 636 is connected between capacitor 632 and the collector of capacitor 606. This path is shunted by another 100 kilohm resistor 638 in series with a 1N3195 diode 639, poled opposite to diode 636. The opposite side of capacitor 622 is connected directly to ground 76. The junction between resistor 638 and diode 639 is coupled through a 62 kilohm resistor 642 to the A terminal.

In operation, transistors 604 and 606 serve as amplifiers sensing the signals to the bases of transistors 402 and 412 in the servo amplifier. The diodes 635 and 636 block some AC noise coupled back from the shading coil side of the transistors, preventing this noise from being coupled to the servo response control circuit 120, since it does not represent an input noise which should modify the operation of the servo amplifier.

Resistors 600 and 602 prevent transistors 604 and 606 from loading the servo amplifier. These transistors function essentially as switching transistors, since the signals levels to the bases of transistors 402 and 412 are of sufficient magnitude to drive transistors 604 and 606 from cut off to saturation with a very small displacement of the servo potentiometer. If transistor 604 is cut off, for example, capacitor 620 charges toward the +18 volts, which flows through resistor 608 and 625, and through diode 626 to the capacitor 620.

When the servomechanism drives through null and goes in the opposite direction, the voltages coupled to the base of transistor 412 reverse, causing transistor 604 to be driven into saturation, and thus connecting charging circuit 612 to ground 76. Capacitor 620 now discharges through diode 629 and resistor 631, while the opposite capacitor 622 starts to charge in the same manner as previously described for capacitor 620.

The charging resistors 625 and 635, and the discharging resistors 631 and 642 are chosen to produce a much higher rate of discharge than charge. Thus, when the servomechanism makes a series of reversals, as when it is oscillating near null or receiving a noisy signal, the capacitors 620 and 622 are alternately charged and discharged with the discharge rate much higher than the charge rate. Under these conditions, the voltage maintained across capacitors 620 and 622 is a small fraction of the +18 volts DC available from the power supply.

Capacitors 620 and 622 are each coupled through a 1N3195 diode 650 and 652, respectively, to the gate G of a FET 655, type MPF 103. Diodes 650 and 652 couple the higher of the two voltages across capacitors 620 and 622 to FET 655, which functions as a source follower to drive the succeeding circuits without loading the charging capacitors. A 500 kilohm resistor 658 coupled between gate G and a source of −12 volts DC potential maintains one of the diodes 650 and 652 conducting slightly at all times, insuring that the voltage at gate G of FET 655 follows the higher of the voltages on the two capacitors 620 and 622. A 20 kilohm resistor 659 couples the source S of FET 655 to −12 volts DC. The drain D is coupled directly to +18 volts DC potential.

The source S of FET 655 is coupled through a 100 kilohm resistor 670 to the base of a 2N3391 transistor 672. The collector of transistor 672 is coupled through a 20 kilohm load resistor 674 to the +18 volts DC potential. The emitter is directly coupled to the base of a 2N3417 transistor 680, the collector of which is directly coupled to terminal C, and the emitter of which is directly coupled to terminal D.

In operation, as the servomechanism is driven off null for longer periods of time, one of the capacitors 620 or 622 is charged to higher amplitude signals, and may approach the +18 volts DC available from the power supply. FET 655 couples the rising voltage to transistor 672, causing it to start to conduct and turn on transistor 680, thereby shorting terminals C and D together. As can be seen with reference to FIG. 5C, the shorting of terminals C and D supplies negative voltage to the emitters of transistors 402 and 412, allowing the one that is being biased on by the signal at its base, to turn on its corresponding transistor 603 or 613, shorting the AC from the corresponding shading coil 100 or 101 to drive the motor at full speed in that direction.

To control the amount of braking of the motor, a second circuit, associated with terminals E and F, is connected to FET 655 of FIG. 7. Source S of FET 655 is coupled through a 200 kilohm resistor 685 to the base of a 2N321 transistor 687. The base and collector of transistor 687 are coupled to the −12 volts DC potential by a 1.0 megohm resistor 688 and a 10 kilohm resistor 689, respectively. The emitter is directly coupled to ground 76. The collector of transistor 687 is also coupled through a 100 kilohm resistor 692 to the base of a 2N3417 transistor 694. The emitter of this transistor is coupled through a 1.0 kilohm resistor 696 to the −12 volts potential, while the collector thereof is coupled through a pair of 2.2 kilohm resistors 700 and 702 to terminals E and F, respectively.

In operation, when the voltage at source S of FET 655 is low, indicating the servomechanism is near null, transistor 694 is driven into saturation, causing current to flow from terminals E and F, through resistors 700 and 702, conducting transistor 694, and resistor 696. As can be seen by referring to FIG. 5C, the current at terminals E and F is supplied by the emitter-base junction of transistors 403 and 413, biasing both transistors to conduct for one-half cycle of AC.

Both transistors 403 and 413 now short one-half of the AC from the shading coil associated therewith. If the servo amplifier is not otherwise biasing one of the transistors 403 and 413 into conduction, as when the inputs 90 and 97 of FIG. 5C have balanced signals thereon, each shading coil attempts to rotate the armature by similar amounts, causing the armature to vibrate but not move any significant amount in either direction. This insures that the armature can immediately rotate when an unbalance to the servo amplifier 50 of FIG. 5C is received.

When one of the transistors 403 or 413 is driven fully on by the servo amplifier, the further forward bias from terminals E and F does not affect its operation. However, the opposite transistor, due to the current from terminals E and F, still shorts one-half of the AC from the shading coil associated therewith, introducing an opposite driving force for one-half of the cycle, so that the servo motor can only be driven slowly. This prevents the servomechanism from jumping off null too quickly, and further allows the servomechanism to approach null at a slow speed. As the voltage at the source S of FET 655 rises, transistor 694 is gradually cut off, causing the braking transistor 403 or 413 to short lesser amplitudes of AC, gradually eliminating the opposite braking force and allowing the servo motor to run at full speed.

Transistors 403 and 413 are connected as AC switches which, depending on the bias thereto, pass both cycles of the AC waveform, then lesser amplitudes of one-half cycle of the AC, and finally lesser amplitudes of the remaining one-half cycle of the AC until no waveform is passed by the transistor. When passing less than full AC, the circuit continuously controls the amount of braking by the opposite shading coil, and hence allows smooth speed control of the servo motor. As each half cycle of the AC waveform is distorted in amplitude, a DC component is introduced in the shading coils, however, this DC component has little effect on the servo motor, due to the small size of the shading coil windings. For a detailed explanation of the theory and operation of the circuit of transistor 403 or 413, when coupled to an AC source (here the output across the shading coils), in order to pass variable amounts of AC/DC, reference should be made to the copending application of William H. Plumpe, Jr., one of the applicants herein, entitled "Control Circuit," filed on even date with the present application, and assigned to the same assignee as the present application.

The resulting servomechanism has a speed proportional to the duration of the off null signal, rather than to the magnitude of the off null signal. Due to the circuit 120 of FIG. 7, the servo amplifier of FIG. 5C may be run at full gain and function essentially as a switching circuit.

However, rapid fluctuations in the signal around null are not followed, since the servomechanism is driven slowly at this time. Since the distance off null is not important, the magnitude of the voltage across the feedback potentiometer 111 of FIG. 5B is not important as long as a reasonable signal to noise ratio is maintained. This makes the system particularly suited for rate measurements where the voltage across the potentiometer may rapidly change.

Although the capacitors 620 and 622 may be charged beyond the voltage required to give full drive when a large signal change is coupled to the servo amplifier, the differentiator operational amplifier 117 of FIG. 5C introduces an oppositely going rate signal, as previously described, which provides the electrical signal necessary to slow the servomechanism as it approaches null, and thus stop overshoot. The differentiator insures sufficient time for the capacitors 620 and 622 of FIG. 7 to discharge. On a perfectly steady signal, the servomechanism may slowly vary across null, due to the stepped output from a wire wound potentiometer, since usually no winding is exactly at null. The circuit 120 allows the servomechanism to slowly run back and forth across null, but only makes small excursions, since the servomechanism never moves beyond null long enough to build up full drive. Thus, due to the combination of circuits cooperating with the servomechanism, a fast reacting system is provided which is immune to noise impulses and other disturbances.

We claim:

1. In an analyzing system including transducer means for generating a signal representative of a characteristic being analyzed, means for calculating the rate at which a function related nonlinearly to said characteristic is changing, comprising:

means for differentiating a signal;

servomechanism means including a servo amplifier for producing an output movement proportional to the difference between a pair of signals coupled to inputs of the servo amplifier;

means coupling the output of said differentiating means to one of the inputs of said servo amplifier;

a feedback device having an output dependent upon an electrical input thereto and a mechanical input thereto;

means coupling the output of said feedback device to the other of the inputs of said servo amplifier;

means coupling the movement of the servomechanism to the mechanical input of said feedback device; and means connected with said transducer means for coupling said characteristic representative signal to said differentiating means and to the electrical input of said feedback device, whereby the movement of said servomechanism is directly proportional to the rate of change of said nonlinear function.

2. The rate calculating means of claim 1 wherein said feedback device is a potentiometer having first and second terminals with a fixed resistance therebetween and a third terminal connected to a wiper mechanically movable across the resistance of the potentiometer, said means connected with said transducer means coupling said characteristic representative signal across said first and second terminals which form the electrical input of said feedback device, said servomechanism coupling means moving said wiper which forms the mechanical input of said feedback device across said resistance of said feedback device, and said feedback device output coupling means connecting said third terminal which forms the output of said feedback device to said other input of said servo amplifier.

3. The rate calculating means of claim 2 in a chemical analyzing system, including a spectrophotometer for analyzing a solution, wherein the signal from said transducer means corresponds to the transmittance of the solution, said transmittance signal being coupled across said first and second terminals of said potentiometer, and said differentiating means couples the time derivative of transmittance to said one input of said servo amplifier, whereby the movement of said servomechanism is proportional to the rate of change of optical density of said solution.

4. The rate calculating means of claim 1 including means for controlling the response of the servomechanism comprising means for differentiating a selected one of the pair of signals coupled to the inputs of the servo amplifier and for adding said differentiated signal to the selected one signal, whereby said servomechanism has an additional output movement responsive to the rate of change of said selected one signal.

5. The rate calculating means of claim 1 including means for controlling the response of the servomechanism comprising means for shunting the signals at the pair of inputs of said servo amplifier when the signals have a rapid change in value.

6. The rate calculating means of claim 1 including means for controlling the response of the servomechanism comprising means for causing said servomechanism output to move slowly when the signals to the pair of inputs of said servo amplifier have approximately like values, including means continuing to cause said servomechanism output to move slowly for a time duration after the signals to the inputs of said servo amplifier change from like values, thereby preventing sudden servomechanism movement when the servomechanism is near null.

7. The rate calculating means of claim 6 wherein said continuing means allows said servomechanism to gradually increase speed of movement as the signals to the inputs of the servo amplifier continue to be of unlike value, thereby allowing said servomechanism to gradually progress towards maximum speed as the signals remain off null.

8. The rate calculating means of claim 3 further including read out means coupled to said servomechanism for producing an indication proportional to the rate of change of optical density of said solution.

9. The rate calculating means of claim 8 further including multiplier means connected in series between said differentiating means and said one input of said servo amplier to scale the time derivative of transmittance by a fixed ratio to produce on said read out device a direct indication of the rate of change of concentration of the solution.

10. In an analyzing system including transducer means for generating a transmittance signal, means for calculating the rate of change of optical density, comprising:

differentiator means coupled to said transducer for differentiating said transmittance signal with respect to time to produce a derivative signal;

circuit means coupled to said transducer means for producing a signal proportional to said transmittance signal; and other means coupled to said differentiator means and said circuit means for dividing the derivative signal by the signal proportional to the transmittance signal to produce a rate signal representative of the rate of change of optical density.

11. The rate calculating means of claim 10 wherein said differentiator means includes means having an impedance path selectably connectable in said differentiator means to reduce the time necessary to read a new rate reading.

12. The rate calculating means of claim 10 wherein said differentiator means includes range means or selecting a range of frequencies higher than the expected frequency of the rate which is to be calculated, and means responsive to said range means for discriminating against said higher frequencies.

13. The rate calculating means of claim 10 wherein said other means comprises servo amplifier means.

14. The rate calculating means of claim 13 wherein said servo amplifier means has first and second input means connected respectively to said circuit means and said differentiator means for respectively receiving said signal proportional to said transmittance signal and said derivative signal, and servo amplifier output means for providing said rate signal.

15. The rate calculating means of claim 14 wherein said circuit means includes inverter means connected between said transducer means and said first input means.

16. The rate calculating means of claim 14 including indicating means coupled to said servo amplifier output means and responsive to said rate signal for indicating the rate of change of optical density.

References Cited

UNITED STATES PATENTS

| | | | |
|---|---|---|---|
| 3,096,137 | 7/1963 | Silard | 356—105 |
| 3,167,377 | 1/1965 | Pelavin | 356—181 |
| 3,245,304 | 4/1966 | Davis | 356—201 |
| 3,377,467 | 4/1968 | Staunton et al. | 356—201 |
| 3,392,624 | 7/1968 | Ke et al. | 356—186 |
| 3,453,047 | 7/1969 | Olson et al. | 356—4 |
| 3,490,875 | 1/1970 | Harmon et al. | 356—88 |

OTHER REFERENCES

"C & EN Special Report," Instruments for Clinical Chemistry Labs, Dec. 9, 1963; C & EN, pp. 118, 119, 124.

RONALD L. WIBERT, Primary Examiner

V. P. McGRAW, Assistant Examiner

U.S. Cl. X.R.

23—252 R; 235—151.35; 356—180, 201